US008363952B2

(12) United States Patent
Bigioi et al.

(10) Patent No.: US 8,363,952 B2
(45) Date of Patent: *Jan. 29, 2013

(54) FACE RECOGNITION TRAINING METHOD AND APPARATUS

(75) Inventors: Petronel Bigioi, Galway (IE); Eran Steinberg, San Francisco, CA (US); Peter Corcoran, Claregalway (IE)

(73) Assignee: DigitalOptics Corporation Europe Limited, Galway (IE)

( * ) Notice: Subject to any disclaimer, the term of this patent is extended or adjusted under 35 U.S.C. 154(b) by 0 days.

This patent is subject to a terminal disclaimer.

(21) Appl. No.: 12/913,772

(22) Filed: Oct. 28, 2010

(65) Prior Publication Data

US 2011/0058060 A1 Mar. 10, 2011

Related U.S. Application Data

(63) Continuation of application No. 12/437,464, filed on May 7, 2009, which is a continuation-in-part of application No. 12/042,104, filed on Mar. 4, 2008, now Pat. No. 8,189,927.

(60) Provisional application No. 60/893,114, filed on Mar. 5, 2007.

(51) Int. Cl.
*G06K 9/46* (2006.01)
(52) U.S. Cl. ........................................ 382/190
(58) Field of Classification Search .................. None
See application file for complete search history.

(56) References Cited

U.S. PATENT DOCUMENTS

| 4,047,187 | A | 9/1977 | Mashimo et al. |
|---|---|---|---|
| 4,317,991 | A | 3/1982 | Stauffer |
| 4,376,027 | A | 3/1983 | Smith et al. |
| RE31,370 | E | 9/1983 | Mashimo et al. |
| 4,638,364 | A | 1/1987 | Hiramatsu |
| 5,018,017 | A | 5/1991 | Sasaki et al. |
| RE33,682 | E | 9/1991 | Hiramatsu |
| 5,063,603 | A | 11/1991 | Burt |
| 5,164,831 | A | 11/1992 | Kuchta et al. |
| 5,164,992 | A | 11/1992 | Turk et al. |

(Continued)

FOREIGN PATENT DOCUMENTS

| GB | 2370438 A1 | 6/2002 |
|---|---|---|
| JP | 5260360 A2 | 10/1993 |

(Continued)

OTHER PUBLICATIONS

PCT Notification of Transmittal of the International Search Report and the Written Opinion of the International Searching Authority, or the Declaration, for PCT Application No. PCT/US2008/055831, dated Jun. 24, 2008, 7 Pages.

(Continued)

*Primary Examiner* — Jason M Repko
*Assistant Examiner* — Jhere Rowland
(74) *Attorney, Agent, or Firm* — Andrew V. Smith

(57) ABSTRACT

A device is trained for face recognition. A first acquired digital image of a scene includes a face. Face image data is extracted and stored in a face image library along with an unique identifier. A second acquired digital image may or may not include the face of the same person as the face in the first acquired digital image. Face recognition is applied to extracted face data of the second digital image, and the face of the first digital image is displayed as a match to the face of the second digital image when the first and second images are determined to match or the second digital image or a face therein is identified with biometric data stored along with the first digital image when the faces in the first and second images are determined to match.

33 Claims, 6 Drawing Sheets

U.S. PATENT DOCUMENTS

| | | |
|---|---|---|
| 5,227,837 A | 7/1993 | Terashita |
| 5,280,530 A | 1/1994 | Trew et al. |
| 5,291,234 A | 3/1994 | Shindo et al. |
| 5,311,240 A | 5/1994 | Wheeler |
| 5,384,912 A | 1/1995 | Ogrinc et al. |
| 5,430,809 A | 7/1995 | Tomitaka |
| 5,432,863 A | 7/1995 | Benati et al. |
| 5,488,429 A | 1/1996 | Kojima et al. |
| 5,496,106 A | 3/1996 | Anderson |
| 5,500,671 A | 3/1996 | Andersson et al. |
| 5,576,759 A | 11/1996 | Kawamura et al. |
| 5,633,678 A | 5/1997 | Parulski et al. |
| 5,638,136 A | 6/1997 | Kojima et al. |
| 5,642,431 A | 6/1997 | Poggio et al. |
| 5,680,481 A | 10/1997 | Prasad et al. |
| 5,684,509 A | 11/1997 | Hatanaka et al. |
| 5,706,362 A | 1/1998 | Yabe |
| 5,710,833 A | 1/1998 | Moghaddam et al. |
| 5,724,456 A | 3/1998 | Boyack et al. |
| 5,744,129 A | 4/1998 | Dobbs et al. |
| 5,745,668 A | 4/1998 | Poggio et al. |
| 5,774,129 A | 6/1998 | Poggio et al. |
| 5,774,747 A | 6/1998 | Ishihara et al. |
| 5,774,754 A | 6/1998 | Ootsuka |
| 5,781,650 A | 7/1998 | Lobo et al. |
| 5,802,208 A | 9/1998 | Podilchuk et al. |
| 5,812,193 A | 9/1998 | Tomitaka et al. |
| 5,818,975 A | 10/1998 | Goodwin et al. |
| 5,835,616 A | 11/1998 | Lobo et al. |
| 5,842,194 A | 11/1998 | Arbuckle |
| 5,844,573 A | 12/1998 | Poggio et al. |
| 5,852,823 A | 12/1998 | De Bonet |
| 5,870,138 A | 2/1999 | Smith et al. |
| 5,911,139 A | 6/1999 | Jain et al. |
| 5,911,456 A | 6/1999 | Tsubouchi et al. |
| 5,978,519 A | 11/1999 | Bollman et al. |
| 5,991,456 A | 11/1999 | Rahman et al. |
| 6,053,268 A | 4/2000 | Yamada |
| 6,072,904 A | 6/2000 | Desai et al. |
| 6,097,470 A | 8/2000 | Buhr et al. |
| 6,101,271 A | 8/2000 | Yamashita et al. |
| 6,128,397 A | 10/2000 | Baluja et al. |
| 6,142,876 A | 11/2000 | Cumbers |
| 6,148,092 A | 11/2000 | Qian |
| 6,188,777 B1 | 2/2001 | Darrell et al. |
| 6,192,149 B1 | 2/2001 | Eschbach et al. |
| 6,234,900 B1 | 5/2001 | Cumbers |
| 6,246,790 B1 | 6/2001 | Huang et al. |
| 6,249,315 B1 | 6/2001 | Holm |
| 6,263,113 B1 | 7/2001 | Abdel-Mottaleb et al. |
| 6,268,939 B1 | 7/2001 | Klassen et al. |
| 6,282,317 B1 | 8/2001 | Luo et al. |
| 6,301,370 B1 | 10/2001 | Steffens et al. |
| 6,332,033 B1 | 12/2001 | Qian |
| 6,349,373 B2 | 2/2002 | Sitka et al. |
| 6,351,556 B1 | 2/2002 | Loui et al. |
| 6,389,181 B2 | 5/2002 | Shaffer et al. |
| 6,393,148 B1 | 5/2002 | Bhaskar |
| 6,400,470 B1 | 6/2002 | Takaragi et al. |
| 6,400,830 B1 | 6/2002 | Christian et al. |
| 6,404,900 B1 | 6/2002 | Qian et al. |
| 6,407,777 B1 | 6/2002 | DeLuca |
| 6,418,235 B1 | 7/2002 | Morimoto et al. |
| 6,421,468 B1 | 7/2002 | Ratnakar et al. |
| 6,430,307 B1 | 8/2002 | Souma et al. |
| 6,430,312 B1 | 8/2002 | Huang et al. |
| 6,438,264 B1 | 8/2002 | Gallagher et al. |
| 6,456,732 B1 | 9/2002 | Kimbell et al. |
| 6,459,436 B1 | 10/2002 | Kumada et al. |
| 6,473,199 B1 | 10/2002 | Gilman et al. |
| 6,501,857 B1 | 12/2002 | Gotsman et al. |
| 6,502,107 B1 | 12/2002 | Nishida |
| 6,504,942 B1 | 1/2003 | Hong et al. |
| 6,504,951 B1 | 1/2003 | Luo et al. |
| 6,516,154 B1 | 2/2003 | Parulski et al. |
| 6,526,161 B1 | 2/2003 | Yan |
| 6,554,705 B1 | 4/2003 | Cumbers |
| 6,556,708 B1 | 4/2003 | Christian et al. |
| 6,564,225 B1 | 5/2003 | Brogliatti et al. |
| 6,567,775 B1 | 5/2003 | Maali et al. |
| 6,567,983 B1 | 5/2003 | Shiimori |
| 6,606,398 B2 | 8/2003 | Cooper |
| 6,633,655 B1 | 10/2003 | Hong et al. |
| 6,661,907 B2 | 12/2003 | Ho et al. |
| 6,697,503 B2 | 2/2004 | Matsuo et al. |
| 6,697,504 B2 | 2/2004 | Tsai |
| 6,754,389 B1 | 6/2004 | Dimitrova et al. |
| 6,760,465 B2 | 7/2004 | McVeigh et al. |
| 6,765,612 B1 | 7/2004 | Anderson et al. |
| 6,783,459 B2 | 8/2004 | Cumbers |
| 6,801,250 B1 | 10/2004 | Miyashita |
| 6,826,300 B2 | 11/2004 | Liu et al. |
| 6,850,274 B1 | 2/2005 | Silverbrook et al. |
| 6,876,755 B1 | 4/2005 | Taylor et al. |
| 6,879,705 B1 | 4/2005 | Tao et al. |
| 6,928,231 B2 | 8/2005 | Tajima |
| 6,940,545 B1 | 9/2005 | Ray et al. |
| 6,965,684 B2 | 11/2005 | Chen et al. |
| 6,993,157 B1 | 1/2006 | Oue et al. |
| 7,003,135 B2 | 2/2006 | Hsieh et al. |
| 7,020,337 B2 | 3/2006 | Viola et al. |
| 7,027,619 B2 | 4/2006 | Pavlidis et al. |
| 7,035,456 B2 | 4/2006 | Lestideau |
| 7,035,467 B2 | 4/2006 | Nicponski |
| 7,038,709 B1 | 5/2006 | Verghese |
| 7,038,715 B1 | 5/2006 | Flinchbaugh |
| 7,046,339 B2 | 5/2006 | Stanton et al. |
| 7,050,607 B2 | 5/2006 | Li et al. |
| 7,064,776 B2 | 6/2006 | Sumi et al. |
| 7,082,212 B2 | 7/2006 | Liu et al. |
| 7,092,555 B2 | 8/2006 | Lee et al. |
| 7,099,510 B2 | 8/2006 | Jones et al. |
| 7,110,575 B2 | 9/2006 | Chen et al. |
| 7,113,641 B1 | 9/2006 | Eckes et al. |
| 7,119,838 B2 | 10/2006 | Zanzucchi et al. |
| 7,120,279 B2 | 10/2006 | Chen et al. |
| 7,151,843 B2 | 12/2006 | Rui et al. |
| 7,158,680 B2 | 1/2007 | Pace |
| 7,162,076 B2 | 1/2007 | Liu |
| 7,162,101 B2 | 1/2007 | Itokawa et al. |
| 7,171,023 B2 | 1/2007 | Kim et al. |
| 7,171,025 B2 | 1/2007 | Rui et al. |
| 7,175,528 B1 | 2/2007 | Cumbers |
| 7,187,786 B2 | 3/2007 | Kee |
| 7,190,829 B2 | 3/2007 | Zhang et al. |
| 7,200,249 B2 | 4/2007 | Okubo et al. |
| 7,218,759 B1 * | 5/2007 | Ho et al. .................. 382/118 |
| 7,227,976 B1 | 6/2007 | Jung et al. |
| 7,254,257 B2 | 8/2007 | Kim et al. |
| 7,274,822 B2 | 9/2007 | Zhang et al. |
| 7,274,832 B2 | 9/2007 | Nicponski |
| 7,315,631 B1 | 1/2008 | Corcoran et al. |
| 7,317,816 B2 | 1/2008 | Ray et al. |
| 7,324,670 B2 | 1/2008 | Kozakaya et al. |
| 7,330,570 B2 | 2/2008 | Sogo et al. |
| 7,357,717 B1 | 4/2008 | Cumbers |
| 7,440,594 B2 | 10/2008 | Takenaka |
| 7,551,755 B1 | 6/2009 | Steinberg et al. |
| 7,555,148 B1 | 6/2009 | Steinberg et al. |
| 7,558,408 B1 | 7/2009 | Steinberg et al. |
| 7,564,994 B1 | 7/2009 | Steinberg et al. |
| 7,587,068 B1 | 9/2009 | Steinberg et al. |
| 2001/0028731 A1 | 10/2001 | Covell et al. |
| 2001/0031129 A1 | 10/2001 | Tajima |
| 2001/0031142 A1 | 10/2001 | Whiteside |
| 2002/0105662 A1 | 8/2002 | Patton et al. |
| 2002/0106114 A1 | 8/2002 | Yan et al. |
| 2002/0113879 A1 | 8/2002 | Battle et al. |
| 2002/0114535 A1 | 8/2002 | Luo |
| 2002/0132663 A1 | 9/2002 | Cumbers |
| 2002/0136433 A1 | 9/2002 | Lin |
| 2002/0141586 A1 | 10/2002 | Margalit et al. |
| 2002/0168108 A1 | 11/2002 | Loui et al. |
| 2002/0172419 A1 | 11/2002 | Lin et al. |
| 2003/0025812 A1 | 2/2003 | Slatter |
| 2003/0035573 A1 | 2/2003 | Duta et al. |
| 2003/0043160 A1 * | 3/2003 | Elfving et al. .................. 345/581 |

| | | | |
|---|---|---|---|
| 2003/0048926 A1 | 3/2003 | Watanabe | |
| 2003/0048950 A1 | 3/2003 | Savakis et al. | |
| 2003/0052991 A1 | 3/2003 | Stavely et al. | |
| 2003/0059107 A1 | 3/2003 | Sun et al. | |
| 2003/0059121 A1 | 3/2003 | Savakis et al. | |
| 2003/0084065 A1 | 5/2003 | Lin et al. | |
| 2003/0086134 A1 | 5/2003 | Enomoto | |
| 2003/0086593 A1 | 5/2003 | Liu et al. | |
| 2003/0107649 A1 | 6/2003 | Flickner et al. | |
| 2003/0118216 A1 | 6/2003 | Goldberg | |
| 2003/0122839 A1 | 7/2003 | Matraszek et al. | |
| 2003/0128877 A1 | 7/2003 | Nicponski | |
| 2003/0156202 A1 | 8/2003 | Van Zee | |
| 2003/0158838 A1 | 8/2003 | Okusa | |
| 2003/0198368 A1 | 10/2003 | Kee | |
| 2003/0210808 A1 | 11/2003 | Chen et al. | |
| 2004/0008258 A1 | 1/2004 | Aas et al. | |
| 2004/0136574 A1 | 7/2004 | Kozakaya et al. | |
| 2004/0145660 A1 | 7/2004 | Kusaka | |
| 2004/0207722 A1 | 10/2004 | Koyama et al. | |
| 2004/0210763 A1 | 10/2004 | Jonas | |
| 2004/0213454 A1 | 10/2004 | Lai et al. | |
| 2004/0223063 A1 | 11/2004 | DeLuca et al. | |
| 2004/0264780 A1* | 12/2004 | Zhang et al. | 382/224 |
| 2005/0013479 A1 | 1/2005 | Xiao et al. | |
| 2005/0036676 A1 | 2/2005 | Heisele | |
| 2005/0063569 A1 | 3/2005 | Colbert et al. | |
| 2005/0069208 A1 | 3/2005 | Morisada | |
| 2005/0129278 A1 | 6/2005 | Rui et al. | |
| 2006/0006077 A1 | 1/2006 | Mosher et al. | |
| 2006/0018521 A1 | 1/2006 | Avidan | |
| 2006/0104488 A1 | 5/2006 | Bazakos et al. | |
| 2006/0120599 A1 | 6/2006 | Steinberg et al. | |
| 2006/0140055 A1 | 6/2006 | Ehrsam et al. | |
| 2006/0140455 A1 | 6/2006 | Costache et al. | |
| 2006/0177100 A1 | 8/2006 | Zhu et al. | |
| 2006/0177131 A1 | 8/2006 | Porikli | |
| 2006/0204053 A1* | 9/2006 | Mori et al. | 382/118 |
| 2006/0228040 A1 | 10/2006 | Simon et al. | |
| 2006/0239515 A1 | 10/2006 | Zhang et al. | |
| 2006/0251292 A1 | 11/2006 | Gokturk et al. | |
| 2007/0011651 A1 | 1/2007 | Wagner | |
| 2007/0053335 A1* | 3/2007 | Onyon et al. | 370/338 |
| 2007/0091203 A1 | 4/2007 | Peker et al. | |
| 2007/0098303 A1 | 5/2007 | Gallagher et al. | |
| 2007/0154095 A1 | 7/2007 | Cao et al. | |
| 2007/0154096 A1 | 7/2007 | Cao et al. | |
| 2008/0089561 A1* | 4/2008 | Zhang | 382/118 |
| 2008/0137919 A1 | 6/2008 | Kozakaya et al. | |
| 2008/0144966 A1 | 6/2008 | Steinberg et al. | |

FOREIGN PATENT DOCUMENTS

| | | |
|---|---|---|
| WO | WO2007142621 A1 | 12/2007 |
| WO | WO2008015586 A2 | 2/2008 |
| WO | WO 2008/109622 A1 | 9/2008 |
| WO | WO2008107112 A2 | 9/2008 |
| WO | WO2008107112 A3 | 1/2009 |
| WO | WO2010063463 A2 | 6/2010 |
| WO | WO2010063463 A3 | 6/2010 |

OTHER PUBLICATIONS

PCT International Preliminary Report on Patentability Chapter I, for PCT Application No. PCT/US2008/055831, dated Sep. 8, 2008, 5 Pages.
PCT Written Opinion of the International Search Authority, for PCT Application No. PCT/US2008/055831, dated Sep. 5, 2008, 4 Pages.
EPO Communication regarding the transmission of the European search report, European search opinion, and Supplementary European search report, for European patent application No. 08743677.0, report dated Feb. 14, 2011, 6 Pages.
Beymer, David, "Pose-Invariant face Recognition Using Real and Virtual Views, A.I. Technical Report No. 1574", Massachusetts Institute of Technology Artificial Intelligence Laboratory, 1996, pp. 1-176.
Bradski Gary et al., "Learning-Based Computer Vision with Intel's Open Source Computer Vision Library", Intel Technology, 2005, pp. 119-130, vol. 9—Issue 2.
Chang, T., "Texture Analysis and Classification with Tree-Structured Wavelet Transform", IEEE Transactions on Image Processing, 1993, pp. 429-441, vol. 2—Issue 4.
Chen et al., "Face annotation for family photo album management", International Journal of Image and Graphics, 2003, vol. 3—Issue 1.
Corcoran, P. et al., "Automatic Indexing of Consumer Image Collections Using Person Recognition Techniques", Digest of Technical Papers. International Conference on Consumer Electronics, 2005, pp. 127-128.
Corcoran, Peter et al., "Automated sorting of consumer image collections using face and peripheral region image classifiers", IEEE Transactions on Consumer Electronics, 2005, pp. 747-754, vol. 51—Issue 3.
Corcoran Peter et al., "Combining PCA-based Datasets without Retraining of the Basis Vector Set", IEEE PC, 2007.
Costache, G. et al., "In-Camera Person-Indexing of Digital Images", Digest of Technical Papers. International Conference on Consumer Electronics, 2006, pp. 339-340.
Demirkir, C. et al., "Face detection using boosted tree classifier stages", Proceedings of the IEEE 12th Signal Processing and Communications Applications Conference, 2004, pp. 575-578.
Drimbarean, A.F. et al., "Image Processing Techniques to Detect and Filter Objectionable Images based on Skin Tone and Shape Recognition", International Conference on Consumer Electronics, 2001, pp. 278-279.
Hall, P. et al., "Adding and Subtracting eigenspaces", Proceedings of the British Machine Vision Conference, 1999, pp. 453-462, vol. 2.
Hall, P. et al., "Adding and subtracting eigenspaces with eigenvalue decomposition and singular value decomposition", Image and Vision Computing, 2002, pp. 1009-1016, vol. 20—Issue 13-14.
Hall, P. et al., "Merging and Splitting Eigenspace Models, XP008081056, ISSN: 0162-8828, Pages Searching Authority, or the Declaration, for PCT Application No. PCT/IB2007/003985, dated Jun. 17, 2008, 20 pages.", IEEE Transactions on Pattern Analysis and MachineIntelligence, 2000, pp. 1042-1049, vol. 22—Issue 9.
Hall, Peter et al., "Incremental Eigenanalysis for Classification, XP008091807", British Machine Vision Conference, pp. 286-295.
Huang et al., "Image Indexing Using Color Correlograms", Proceedings of the 1997 Conference on Computer Vision and Pattern Recognition (CVPR '97), 1997, pp. 762.
Jebara, Tony S. et al., "3D Pose Estimation and Normalization for Face Recognition, A Thesis submitted to the Faculty of Graduate Studies and Research in Partial fulfillment of the requirements of the degree of Bachelor of Engineering", Department of Electrical Engineering, 1996, pp. 1-121, McGill University.
Kusumoputro, B. et al., "Development of 3D Face Databases by Using Merging and Splitting Eigenspace Models, retrieved from URL: http://www.wseas.us/e-library/conferences/digest2003lpapersl466-272.pdf on Sep. 16, 2008 ", WSEAS Trans. on Computers, 2003, pp. 203-209, vol. 2—Issue 1.
Lai, J.H. et al., "Face recognition using holistic Fourier in variant features, http://digitalimaging.inf.brad.ac.uk/publication/pr34-1.pdf.", Pattern Recognition, 2001, pp. 95-109, vol. 34.
Lei et al., "A CBIR Method Based on Color-Spatial Feature", IEEE Region 10th Ann. Int. Conf., 1999.
Liu, X. et al., "Eigenspace updating for non-stationary Process and its application to face recognition", Pattern Recognition, 2003, pp. 1945-1959, vol. 36—Issue 9, Elsevier.
Melenchon, Javier et al., "Efficiently Downdating, Composing and Splitting Singular Value Decompositions Preserving the Mean Information", Pattern Recognition and Image Analysis Lecture Notes in Computer Science, 1990, pp. 436-443, vol. 4478, Springer-Verlag.
Non-Final Office Action mailed May 24, 2010, for U.S. Appl. No. 12/506,124, filed Jul. 20, 2009.
PCT Notification of Transmittal of the International Search Report and the Written Opinion of the International Searching Authority, or the Declaration, for PCT Application No. PCT/IB2007/003985, dated Jun. 17, 2008, 20 pages.
PCT Notification of Transmittal of the International Search Report and the Written Opinion of the International Searching Authority, or the Declaration, for PCT Application No. PCT/US2007/75136, dated Oct. 1, 2008, 9 pages.

Shah, Agam, "CES: Digital Imaging Market Set to Explode, panel says, The Industry Standard, Internet article www.thestandard.com/article.php?story=20040108174644982", 2004, 2 pages.

Stricker et al., "Similarity of color images", SPIE Proc, 1995, pp. 1-12, vol. 2420.

Tjahyadi et al., "Application of the DCT Energy Histogram for Face Recognition", Proceedings of the 2nd International Conference on Information Technology for Application, 2004, pp. 305-310.

Turk, Matthew et al., "Eigenfaces for Recognition", Journal of Cognitive Neuroscience, 1991, 17 pgs, vol. 3—Issue 1.

US Final Office Action dated Oct. 16, 2007, cited in co-pending related application, U.S. Appl. No. 10/764,335.

US Office Action dated Oct. 3, 2008, cited in co-pending related application, U.S. Appl. No. 10/764,274.

US Office Action dated Sep. 25, 2008, cited in co-pending related application, U.S. Appl. No. 10/763,801.

US Office Action dated Sep. 29, 2008, cited in co-pending related application, U.S. Appl. No. 10/764,336.

US Office Action dated Sep. 29, 2008, cited in co-pending related application, U.S. Appl. No. 10/764,339.

Viola, P. et al., "Rapid Object Detection using a Boosted Cascade of Simple Features", Proceedings of the 2001 IEEE Computer Society Conference on Computer Vision and Pattern Recognition, 2001, pp. I-511-I-518, vol. 1.

Viola, P. et al., "Robust Real-Time Face Detection", International Journal of Computer Vision, 2004, pp. 137-154, vol. 57—Issue 2, Kluwer Academic Publishers.

Wan, S.J. et al., "Variance-based color image quantization for frame buffer display", S. K. M. Wong Color Research & Application, 1990, pp. 52-58, vol. 15—Issue 1.

Xin He et al., "Real-Time Human Face Detection in Color Image", International Conference on Machine Learning and Cybernetics, 2003, pp. 2915-2920, vol. 5.

Yang, Ming-Hsuan et al., "Detecting Faces in Images: A Survey, ISSN:0162-8828, http://portal.acm.org/citation.cfm?id=505621&coll=GUIDE&dl=GUIDE&CFID=680-9268&CFTOKEN=82843223.", IEEE Transactions on Pattern Analysis and Machine Intelligence archive, 2002, pp. 34-58, vol. 24—Issue 1, IEEE Computer Society.

Zhang, Jun et al., "Face Recognition: Eigenface, Elastic Matching, and Neural Nets", Proceedings of the IEEE, 1997, pp. 1423-1435, vol. 85—Issue 9.

Zhao, W. et al., "Face recognition: A literature survey, ISSN: 0360-0300, http://portal.acm.org/citation.cfm?id=954342&coll=GUIDE&dl=GUIDE&CFID=680-9268&CFTOKEN=82843223.", ACM Computing Surveys (CSUR) archive, 2003, pp. 399-458, vol. 35—Issue 4, ACM Press.

Zhu Qiang et al., "Fast Human Detection Using a Cascade of Histograms of Oriented Gradients", Proceedings of the 2006 IEEE Computer Society Conference on Computer Vision and Pattern Recognition, 2006, pp. 1491-1498, IEEE Computer Society.

Belle V., "Detection and Recognition of Human Faces using Random Forests for a Mobile Robot" [Online] Apr. 2008, pp. 1-104, RWTH Aachen, De Master of Science Thesis, [retrieved on Apr. 29, 2010], Retrieved from the Internet: URL:http://thomas.deselaers.de/teaching/fi les/belle_master.pdf> Section 5.7 Chapters 3-5.

Boom B., et al., "Investigating the boosting framework for face recognition," Proceedings of the 28th Symposium on Information Theory in the Benelux, Enschede, The Netherlands, 2007, pp. 1-8.

Bourdev L., et al., "Robust Object Detection via Soft Cascade," In: Computer Vision and Pattern Recognition, IEEE Computer Society Conference on, Jun. 20, 2005 to Jun. 26, 2005, IEEE, Piscataway, NJ, USA, 2005, vol. 2, pp. 236-243.

Clippingdale S., et al., "A unified approach to video face detection, tracking and recognition," Image Processing, Proceedings. 1999 International Conference on—Kobe, 1999, vol. 1, pp. 662-666.

Shakhnarovich G., et al., "A unified learning framework for real time face detection and classification," Automatic Face and Gesture Recognition, Proceedings. Fifth IEEE International Conference on, 20020520 IEEE, Piscataway, NJ, USA, 2002, pp. 16-23.

PCT International Preliminary Report on Patentability for PCT Application No. PCT/IB2007/003985, mailed on Feb. 3, 2009, 9 pages.

Shakhnarovich G., et al., "Chapter 7. Face Recognition in Subspaces" In: Handbook of Face Recognition, Li S.Z., et al. (Eds), 2005, Springer, New York, ISBN: 9780387405957, Section 2.1, pp. 141-168.

Wiskott L., et al., "Face recognition by elastic bunch graph matching," Image Processing, Proceedings., International Conference on Santa Barbara, CA, USA, 1997, vol. 1, pp. 129-132.

Rainer Lienhart, Luhong Liang, and Alexander Kuranov, A Detector Tree of Boosted Classifiers for Real-Time Object Detection and Tracking, This paper appears in: Proceedings. 2003 International Conference on Multimedia and Expo, 2003. ICME '03, Jul. 6-9, 2003, 4 Pages.

Chang Huang, Haizhou Ai, Bo Wu, and Shihong Lao, Boosting Nested Cascade Detector for Multi-View Face Detection. Published in: Proceeding ICPR '04 Proceedings of the Pattern Recognition, 17th International Conference on (ICPR'04) vol. 2—vol. 02 IEEE Computer Society Washington, DC, USA, 2004.

Rainer Lienhart, Chapter 6 Video OCR: A Survey and Practitioner's Guide, Video Mining, Video mining by Azriel Rosenfeld, David Scott Doermann, Daniel Dementhon, pp. 155-183, Springer, 2003, XP009046500.

Sinjini Mitra, Marios Savvides: Gaussian Mixture Models Based on the Frequency Spectra for Human Identification and Illumination Classification, Automatic Identification Advanced Technologies, 2005. Fourth IEEE Work Shop on Buffalo, NY, USA Oct. 17-18, 2005, Piscataway, NJ, USA,IEEE, Oct. 17, 2005, pp. 245-250, XP010856528 ISBN: 978-0-7695-2475-7.

A. Z. Kouzani: Illumination-effects compensation in facial images, Systems, Man, and Cybernetics, 1999. IEEE SMC '99 Conference Proceedings. 1999 IEEE International Conference on Tokyo, Japan Oct. 12-15, 1999, Piscataway, NJ, USA,IEEE, US, vol. 6, Oct. 12, 1999, pp. 840-844, XP010363112 ISBN: 978-0-7803-5731-0 DOI: http://dx.doi.org/10.1109/ICSMC.1999.816661.

Maricor Soriano, Elzbieta Marszalec, J. Birgitta Martinkauppi, Matti Pietikainen,: Making saturated facial images useful again, Proceedings of the SPIE, SPIE, Bellingham, VA, vol. 3826, Jun. 17, 1999, pp. 113-121, XP002325961 ISSN: 0277-786X DOI: http://dx.doi.org/10.1117/12.364317.

Terence Sim, Simon Baker, and Maan Bsat: The CMU Pose, Illumination, and Expression (PIE) database, Automatic Face and Gesture Recognition, 2002. Proceedings. Fifth IEEE International Conference on, IEEE, Piscataway, NJ, USA, May 20, 2002, pp. 53-58, XP010949335 ISBN: 978-0-7695-1602-8.

EPO Communication from the Examining Division, for European application No. 08716106.3, dated Feb. 7, 2010, 6 pages.

PCT Notification of Transmittal of the International Search Report, and the Written Opinion of the International Searching Authority, or the Declaration, for PCT Application No. PCT/EP2009/008603, dated Jun. 7, 2010, 13 pages.

PCT Notification Concerning Transmittal of International Preliminary Report on Patentability, Chapter I, for PCT Application No. PCT/EP2009/008603, Jun. 16, 2011, 10 pages.

Final Office Action mailed Jun. 17, 2011 for U.S. Appl. No. 12/506,124, filed Jul. 20, 2009.

Final Office Action mailed Oct. 17, 2008 for U.S. Appl. No. 10/764,335, filed Jan. 22, 2004.

Non-Final Office Action mailed Jul. 14, 2011 for U.S. Appl. No. 12/764,650, filed Apr. 21, 2010.

Non-Final Office Action mailed Mar. 14, 2007 for U.S. Appl. No. 10/764,335, filed Jan. 22, 2004.

Non-Final Office Action mailed Mar. 17, 2008 for U.S. Appl. No. 10/764,335, filed Jan. 22, 2004.

Notice of Allowance mailed Feb. 9, 2009 for U.S. Appl. No. 10/764,274, filed Jan. 22, 2004.

Notice of Allowance mailed Mar. 9, 2009 for U.S. Appl. No. 10/764,274, filed Jan. 22, 2004.

Notice of Allowance mailed Mar. 16, 2009 for U.S. Appl. No. 10/764,336, filed Jan. 22, 2004.

Notice of Allowance mailed Mar. 20, 2009 for U.S. Appl. No. 10/763,801, filed Jan. 22, 2004.

Notice of Allowance mailed Feb. 25, 2009 for U.S. Appl. No. 10/764,339, filed Jan. 22, 2004.

Notice of Allowance mailed Jan. 29, 2009 for U.S. Appl. No. 10/764,339, filed Jan. 22, 2004.
Notice of Allowance mailed Apr. 30, 2009 for U.S. Appl. No. 10/764,335, filed Jan. 22, 2004.
Notice of Allowance, dated Apr. 19, 2012, for U.S. Appl. No. 12/042,104, filed Mar. 4, 2008.
Final Rejection, dated Jan. 6, 2012, for U.S. Appl. No. 12/042,104, filed Mar. 4, 2008.
Non-Final Rejection, dated Jun. 22, 2011, for U.S. Appl. No. 12/042,104, filed Mar. 4, 2008.

* cited by examiner

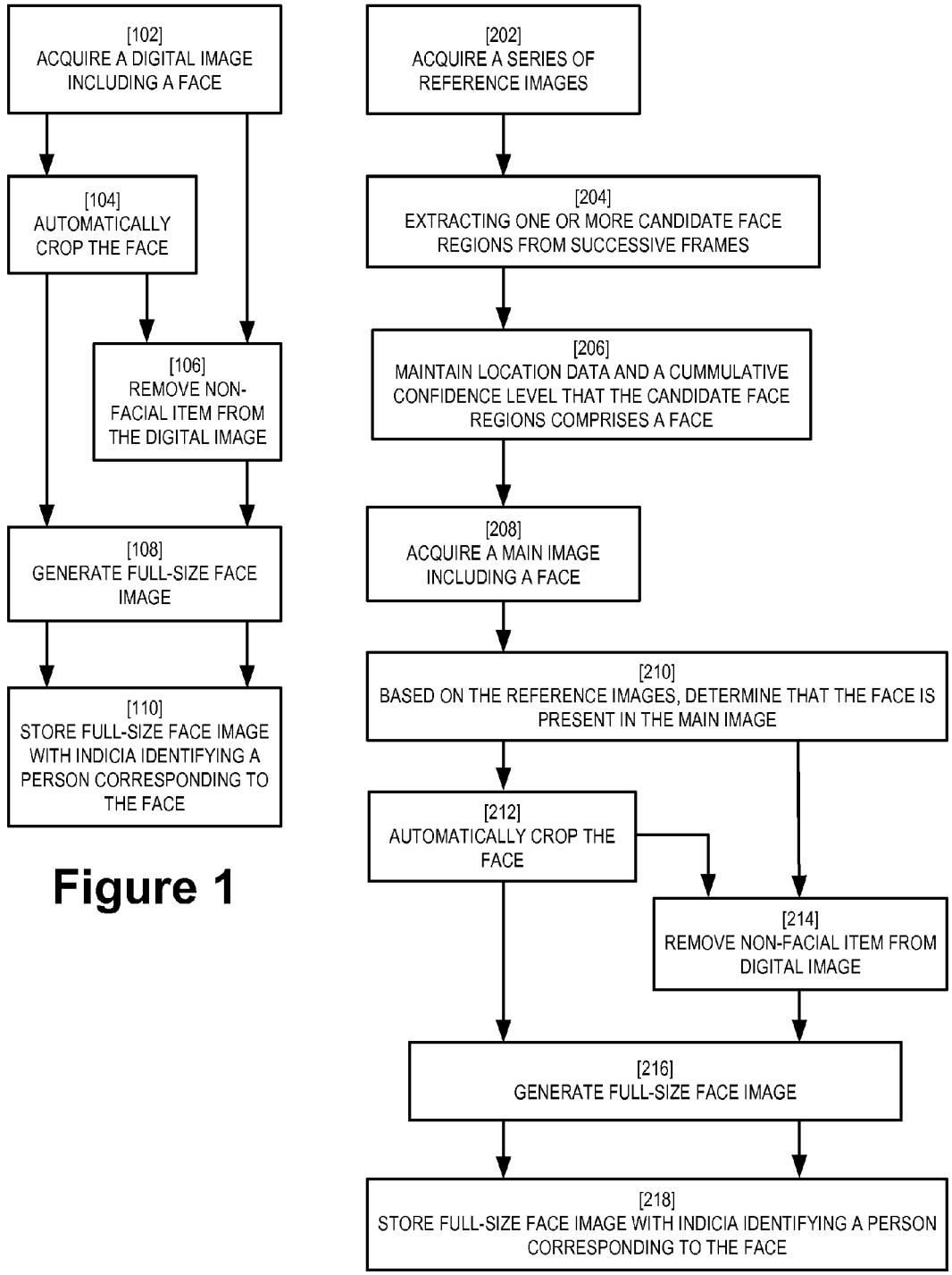

FACE RECOGNITION TRAINING METHOD AND APPARATUS

PRIORITY

This application is a Continuation of U.S. patent application Ser. No. 12/437,464, filed on May 7, 2009, which is a Continuation-in-Part (CIP) of U.S. patent application Ser. No. 12/042,104, filed Mar. 4, 2008, now U.S. Pat. No. 8,189,927, which claims the benefit of priority to U.S. patent application No. 60/893,114, filed Mar. 5, 2007, which are each incorporated by reference.

BACKGROUND OF THE INVENTION

The invention relates to face recognition, particularly on a portable digital camera, camera-phone, embedded device, or handheld, attachable or otherwise portable processor-based device, or other digital image acquisition device.

Digital still cameras, mobile phones and other embedded devices typically have limited or inconvenient text input capabilities. This can make face recognition training inconvenient, for example, if the application requires that a person's name be typed in to identify the person corresponding to an acquired image of a face. It is desired to simplify this training process.

SUMMARY OF THE INVENTION

An application is provided for training a device for face recognition. A first acquired digital image of a scene includes a face. Face image data are stored in a face image library along with an unique identifier and/or biometric data. A second acquired digital image includes the face of the same person as the face in the first acquired digital image. Face recognition is applied to the second digital image, and an attempt is made to determine whether the face in the second digital image matches the face in the first digital image. If there is a match, then the face in the first image may be displayed along with the second image.

A series of preview images may be acquired, and candidate face regions may be extracted from successive frames. The method may further include maintaining location data and a cumulative confidence level that the candidate face region comprises a face. Based on information from the series of preview images, it may be determined that a face is present within a digital image. Manual input of further information, such as the person's name or other identifying indicia relating to the face, may be optionally received for storing with the face image data. The face may be automatically cropped and/or one or more non-facial items may be removed from the digital image, to generate a full-size face image for storage.

The method may further include displaying the face of the first digital image as a match to the face of the second digital image when the faces in the first and second digital images are determined to match. The second digital image may then be stored, including associating the first and second digital images and/or faces contained therein.

The method may include displaying a selectable set of one or more faces from the face image library as possible matches to the face of the second digital image when the faces in the selectable set are determined to have at least a predetermined probability of matching the face of the second digital image. A manual selection of a face from the selectable set may be provided. The second digital image is then stored including associating the selected face of the selectable set with the second digital image and/or the face contained therein.

The method may include assigning the face in the second digital image as a new face when the face in the second digital image is determined not to match any face in the face image library.

A portable digital camera or camera-equipped device having little or no text input capability will benefit with a configuration as described herein. For example, the back of the camera or camera-equipped device may include a user interface other than a keypad for entering text or may have text input capability that is cumbersome. The user can identify a person in an image using another biometric indicator, i.e., a non-text indicator such as the person's typed name. The indicator may have become associated with the image of the person's face in another way such as by the person himself or herself prior to sending to the user, or by storing the image with the biometric data on a Facebook page which is downloadable by the user, or input by a third party.

The indicator may be audio, e.g., the person's name spoken into a microphone, or visual, e.g., a cropped image of the person's face or a face feature or another feature of the person (e.g., hair, eyes, a unique personal artifact such as jewelry, the person's car or house, a family member, a national flag), or combinations of images, which may be retrieved from a library or database stored on the camera or on another device connected to the camera, or some other indicator.

The information stored in the library or database preferably includes both biometric data and face data in certain embodiments. In this way, a face recognition program, which may be fully automatic, semi-automatic with optional or required manual input, or in other embodiments a fully or nearly fully manual process, matches the face in a recently acquired image with a face in the database. Then, because the face in the database is stored along with biometric data identifying the person, the face in the recently acquired image is identified without the need for a user to type in the person's name.

Advantageously, face recognition is applied to extracted face data of a second digital image, and the face of a first digital image stored in a database is displayed as a match to the face of the second digital image, and/or the second digital image or a face therein is identified with biometric data stored along with the first digital image, in either case when the faces in the first and second images are determined to match. This feature makes biometric identification of person's captured in images with a camera or camera-equipped device convenient for the user.

One or more computer readable media are also provided that are encoded with a computer program for programming one or more processors to perform any of the methods described herein.

A digital image acquisition device is also provided that includes a lens, an image sensor, a processor, and a memory having embedded therein processor-readable code for programming the processor to perform any of the methods of face recognition training described herein.

BRIEF DESCRIPTION OF THE DRAWINGS

FIG. 1 illustrates a method of face categorization and annotation of a face image library including cropping of the face in accordance with certain embodiments.

FIG. 2 illustrates a face annotation method involving use of reference images in accordance with certain embodiments.

DETAILED DESCRIPTION OF THE EMBODIMENTS

Figure 3:
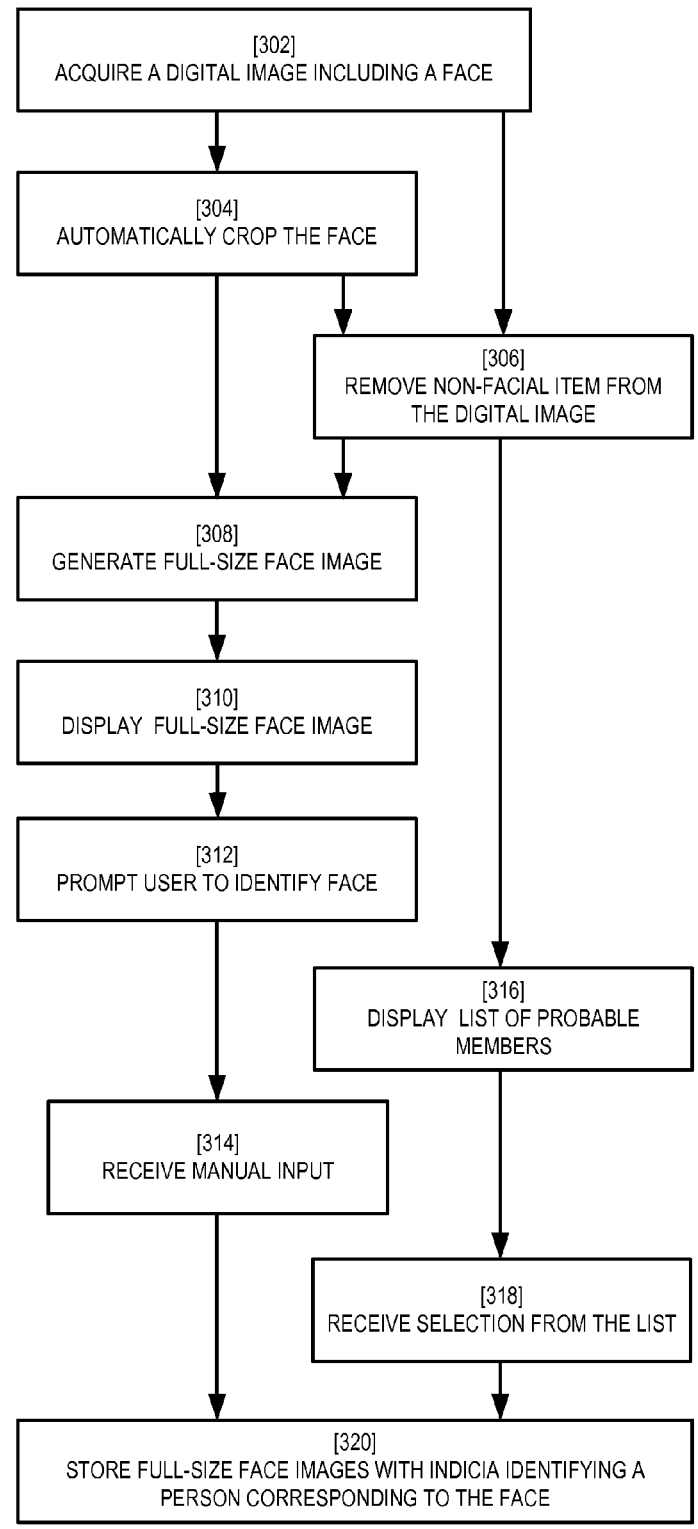
FIG. 3 illustrates a face annotation method involving manual input of identifying indicia in accordance with certain embodiments.

An advantageous method is provided for face categorization and annotation of a face image library. A digital image acquisition device such as a mobile camera phone or other handheld camera device, acquires a digital image of a scene that includes a face. The face is automatically cropped or one or more non-facial items is/are removed from the digital image, or both, and a full-size face image is generated. The full-size face image is stored in a face image library along with other indicia identifying a person corresponding to the face.

A Contact List may be used to link known or unknown, recognized or unrecognized, faces with personal contacts. Communications may be provided for performing additional services with images. Faces may be assigned to contacts and/or a user interface, wherein image quality is improved by cropping and/or otherwise cleaning up the image, e.g., to include only faces or to make the face a certain size. A photographically captured face may be assigned to a built-in contact management system of a handheld device.

A picture may be taken, e.g., by a mobile camera-enabled device of any kind. Multiple images may also preferably be captured around the time the picture was taken which are preview, postview or reference images (together "reference images"), typically having lower resolution than the main picture. A face detection routine then finds any faces in the picture with or without the use of the reference images. The picture can be enhanced using one or more of the reference images, e.g., to add illumination, to replace a frown with a smile, to replace a blink with an open eye, or to add an otherwise occluded feature to a face. An enhanced image of a face in the picture is provided by cropping or otherwise processing the picture with or without using the reference images, and/or using the reference images to provide a better image of the face detected in the picture.

The face may be recognized or unrecognized. If it is unrecognized, then it can be added to a contacts list, along with image metadata and whatever other information a user may wish to add. If it is recognized, then the picture may be added as another look of a same person (e.g., with or without a beard, hat, glasses, certain jewelry, smiling or frowning, eyes open or blinking, one profile or the other or straight on, etc.), or just a smile, e.g., from the new picture may be added over the frown of the man picture which is otherwise kept.

A technique is provided for tracking faces in a series of images on handheld mobile devices. In one aspect, face categorization is enhanced using a built in contact book in the phone or other mobile device.

In another aspect, a workflow and GUI are provided, wherein a user takes a picture that is associated with a name in a contact book and uses face-tracking. The phone can crop the image as well as clean it up, e.g., to keep only the face. An advantage is that with this software, saving a face to a contact becomes useful as opposed to assigning a random picture which means in some cases the face may be so small that it may not be distinguishable or resolvable. Any of the techniques described herein may be combined with those described at U.S. Pat. Nos. 6,407,777, 7,310,450, 7,315,630, 7,336,821, 7,460,695, and 7,315,631, and US published application no. 2006/0204110, 2006/0285754, 2006/0120599, 2006/0140455, 2006/0098890, 2007/0201725, 2008/0031498 and 2007/0110305, and U.S. applications Nos. 10/764,339, 12/063,089, 12/026,484, 11/861,854, 11/753,098, 11/752,925, 11/833,224, 10/763,801, 60/829,883, 11/753,397, 11/766,674, and 11/773,868, which are assigned to the same assignee and are hereby incorporated by reference.

FIG. 1 illustrates a method of face categorization and annotation of a face image library including cropping of the face in accordance with certain embodiments. A digital image is acquired at 102 including a face. The face is then automatically cropped at 104 and/or a non-facial item is removed from the digital image at 106. A full-size face image is generated at 108. The full-size face image is stored at 110 with indicia identifying a person corresponding to the face.

A digital camera may employ a face tracker which analyzes a preview image stream and extracts candidate face regions from successive frames of the preview image stream. These candidate regions are made available within the camera for additional image processing. A detailed description is given in U.S. Pat. No. 7,315,631, which is incorporated by reference. The face tracker maintains a history of each candidate face region including location data and a cumulative confidence level that the candidate region is indeed a face.

FIG. 2 illustrates a face annotation method involving use of reference images in accordance with certain embodiments. A series of reference images are acquired at 202. The reference images may be preview or post-view images, or images acquired with a different sensor than the main image at the same time or at a different time than the acquisition of the main image, at full or low resolution (see, e.g., U.S. application 60/945,558, incorporated by reference). One or more candidate face regions are extracted from successive frames at 204. Location data and a cumulative confidence level that each candidate face region comprises a face are maintained at 206. The main image is acquired at 208 including a face. Based on the reference images, it is determined at 210 that the face is present within the main image. The face is automatically cropped at 212 and/or one or more non-facial items are removed from the digital image at 214. A full-size face image is then generated at 216 based on 212 and/or 214. A full-size face image is stored with indicia indentifying a person corresponding to the face at 218.

Certain embodiments involve devices such as hand held communication devices such as mobile phones, that have a "phone book" built into the device. Face detection is tied into a process wherein a user can assign a photographically-acquired face to an existing or a new contact. Moreover, the image-processing unit can provide a saved region corresponding to the captured face, e.g., using cropping and/or removing other unnecessary details and/or by building a whole face from partial face images and/or brightening a poorly illuminated or rotated or tilted or partially-occluded face, or a face with red-eye, white eye or golden eye defects, or other blemishes possibly induced by dust artifacts in the imaging system of the camera, for what may be otherwise a good picture of a particular contact, among other processing that is possible (see cited references below).

Example

The process can be directed from the phone book or from camera software. For example:
1. In the Contact manager: Create new item
2. In the contact manager: option to insert new data
3. In the contact manager: Option to assign picture which will then:
4. let the user select: Camera or albums.
5. For Camera, the user will take a picture of a subject and the camera will save the cropped image.
6. For the Album, the handset will display the captured images with faces, and the user can select the right picture.
7. Returning to the contact manager: The face will be assigned to the contact.
   Starting from the Camera System:
   a. When the user grabs a picture (and optionally a face is detected) and has an option to save image or to "assign face to a contact".
   b. The user will then select an existing contact or create a new contact to assign the face to.
   The system can also be connected to a face recognition subsystem.

In other embodiments, the image acquisition appliance includes a smartphone which incorporates full mobile phone capability as well as camera capabilities. In this embodiment the recognition subsystems perform an analysis of detected face regions, and extract a pattern of DCT feature vectors, and determine if such face regions match with any of a set of "known" patterns. These "known" patterns will typically have been derived from a larger image collection stored on a user's PC or in a web service and match people in the user's friends, colleagues and family, but it may be stored on the mobile device. We remark that each person may be associated with more than one pattern and people can have different appearances at different times. If a face region matches a "known" pattern, then that face region, and the image it was extracted from, can be associated with the "known" pattern and the person that pattern is linked to. Some aspects of associating multiple face recognition patterns, or "faceprints" with individual persons, or "contacts", are described at U.S. patent application Ser. No. 10/764,339, which is hereby incorporated by reference. Some recognition functions may be performed on a mobile device and the remainder on a desktop PC.

Initial training or learning may be performed outside the phone, e.g., in an expert system format, because better results in training and associating patterns with people can initially be achieved with larger image collections. Nevertheless it is possible to implement training, from scratch, within the device, although the process may be tedious for a casual user.

Certain embodiments provide for the creation of linkages between the known patterns of a face recognition system, and a phone contact list of a user. This can be achieved either through uploading a contact list onto a user's PC and performing association through a direct matching of face regions associated with each "known" pattern with a member of a contact list. Alternatively, it can be achieved on the phone by cycling through "known" patterns and displaying associated face regions.

In other embodiments, ease of usability of contact management is provided on a hand-held device using a built in camera.

Advantageously, a frame is cropped in certain embodiments herein to more substantially fill the frame with the face.

Furthermore, using the camera in connection with a built in contact management of a device enables use of the mobile phone as an annotation device for improving the quality of the recognition process and creating links between newly determined recognition patterns and the contact list, e.g., through a single user action. It relies on the fact that many images will either contain "unknown" people or that "known" people will occasionally be captured with a different appearance from their normal set of patterns. When such unrecognized facial regions are detected by the recognition subsystem, it displays an extracted face region on the screen and prompts the user to associate this "new" region with a member of the contact list. In alternative embodiments, the region may have a probabilistic association with members of the contact list and these may be ordered according to the determined probabilities.

FIG. 3 illustrates a face annotation method involving manual input of identifying indicia in accordance with certain embodiments. A digital image is acquired at 302 including a face. The face is then automatically cropped at 304 and/or a non-facial item is removed from the digital image at 306. A full-size face image is generated at 308. The full-size face image is displayed at 310. The user may be prompted to identify a face at 312, after which manual input may be received at 314. A list of probably members may be displayed at 316 from which a selection may be received from the list at 318. Finally, the full-size face image is stored with indicia identifying the person corresponding to the face.

The face-tracking system, discussed above with reference to FIG. 2, may also automatically rotate the image when determined to be advantageous based on the detection of a face at a particular angle. The software may allow "rotating" the face if it is not full frontal.

Figure 4:
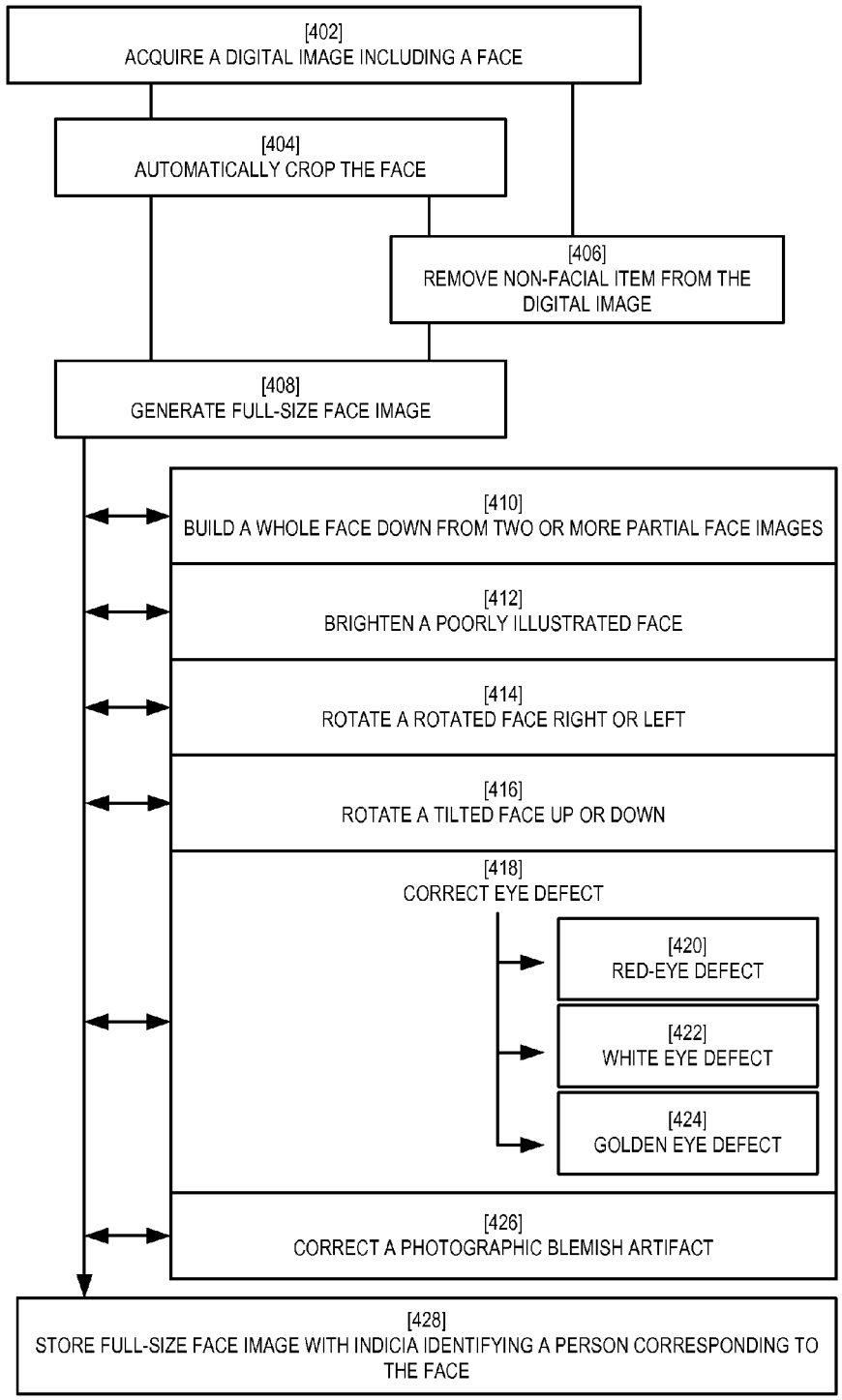
FIG. 4 illustrates a face annotation method including image processing enhancement of the face in accordance with certain embodiments.

FIG. 4 illustrates a face annotation method including image processing enhancement of the face in accordance with certain embodiments. A digital image is acquired at 402 including a face. The face is then automatically cropped at 404 and/or a non-facial item is removed from the digital image at 406. A full-size face image is generated at 408. Several image processing options are available. A whole face may be built from two or more partial facial images at 410. A poorly illuminated face may be brightened at 412. A rotated face may be rotated right or left at 414 or up or down at 416, or in a random direction. An eye defect may be corrected at 418, such as red eye 420, white eye 422 or golden eye 424 (see U.S. Pat. Nos. 7,042,505, and 7,336,821, and US published applications 2005/0041121, 2006/0120599, and 2007/0116380, and U.S. application Ser. Nos. 11/462,035, 11/767,412, 12/042,335, 11/690,834, 11/769,206, and 11/841,855, which are hereby incorporated by reference). A photographic blemish artifact may be corrected at 426. Such blemish may be caused by an imperfection in the optical path caused by dust (see US published application 2005/0068452 and U.S. application Ser. No. 11/836,744, which are incorporated by reference). A full size face image may be stored at 428 along with identifying indicia of a person corresponding to the face.

This associating of the new face region with a member of the contact list achieves at least the following advantageous results in a single action:

It firstly associates the recognition pattern which is derived from the face region with a person in the user's contact list; this information can now be added to the set of recognition patterns and can be applied later as part of a retraining process for optimizing the set of recognition patterns associated with a user's image collection.

Another result is that is provides an association between this new image and a communications device or system with the person determined to be within the image. This could be an e-mail address or a mobile phone number. This association enables a range of added value picture services, an example of which is to enable the automated transmitting of the image to the people within the image. Faces may be found in an image, and the image may be automatically emailed to a user and/or persons associated with the faces found (see, e.g., US published patent application no. 20040243671, which is incorporated by reference), although this does not use inherent communications capabilities of the device in which the images are acquired. An enhancement of this, which relates to the "pairing mechanism" described in US published application no. 2006/0284982, which is incorporated by reference, is to provide a pairing mechanism which is triggered by selecting a member of the contact list; in this embodiment a user can associate such a member of the list with an external, networked device or service. Once such an association is established, each image which is recognized as being associated with that person can be marked for transmission to the associated device/service, placed in a transmission queue and, when the service/device next becomes available on the network, these images can be transmitted to that device/service.

Figure 5:
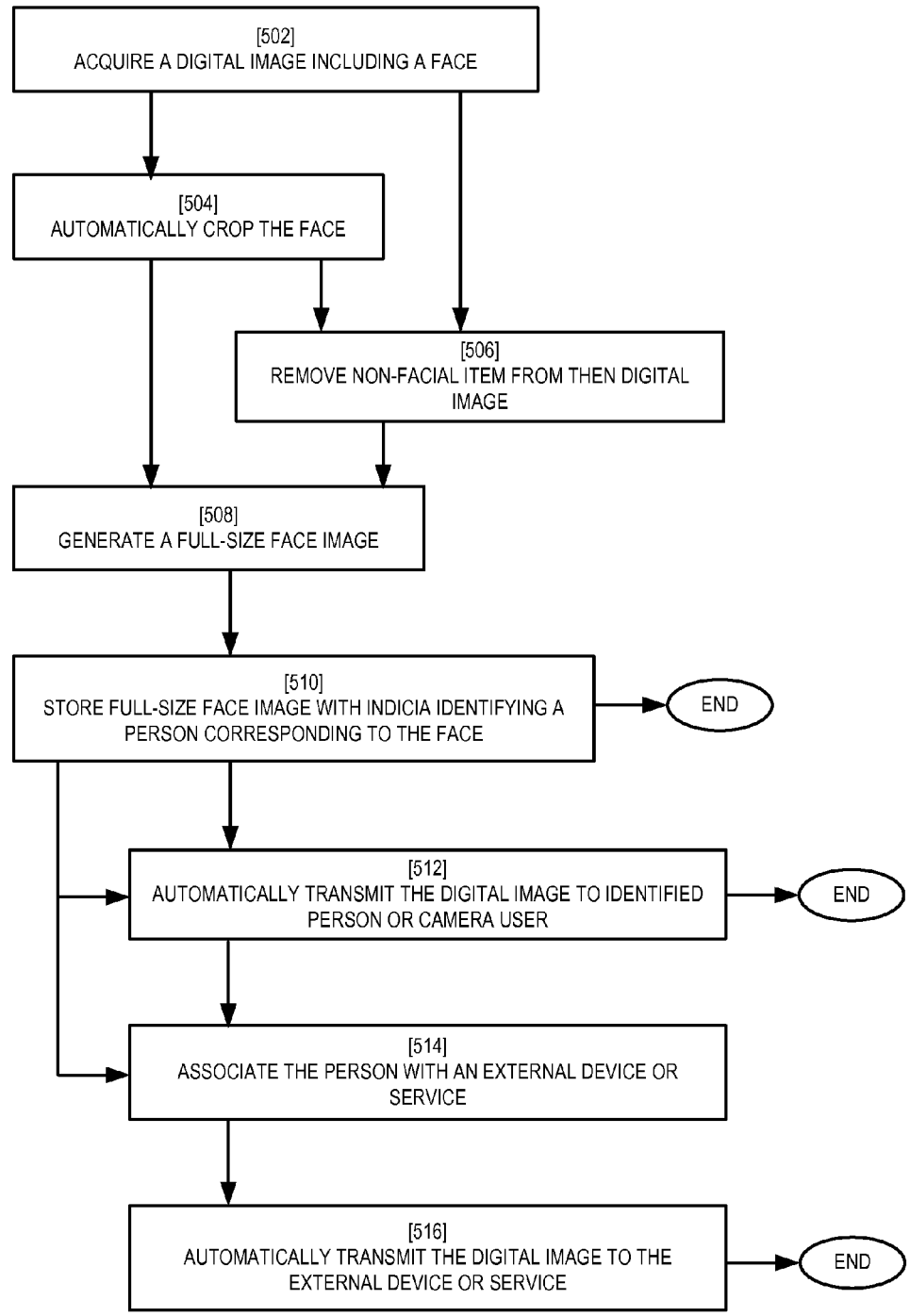
FIG. 5 illustrates a method of face detection and identification including automatic transmission of an acquired image in accordance with certain embodiments.

FIG. 5 illustrates a method of face detection and identification including automatic transmission of an acquired image in accordance with certain embodiments. A digital image is acquired at 502 including a face. The face is then automatically cropped at 504 and/or a non-facial item is removed from the digital image at 506. A full-size face image is generated at 508. A full size face image may be stored at 510 along with identifying indicia of a person corresponding to the face. In addition, the digital image may be transmitted at 512 to an identified person or to the camera user, depending or not on whether the person is recognized in the image. A person may be associated at 514 with an external device or service. The digital image may be automatically transmitted to the external device or service at 516 depending or not on whether the person is recognized in the image.

Alternative Methods

The acquired image may be added to such database as part of the process.

In the case multiple faces are detected, a user interface may be implemented that will allow walking-through face-by-face for the user to decide if that is a face they would like to include or pass.

In a case where a camera is set in a mode of "assigning a face to a contact", there may not be a desire to "capture" an image, but rather, the camera in preview (video) mode may continuously capture multiple images until an "acceptable image" is acquired. Such acceptable image may be a super-resolution of multiple frames, when a face is detected in frontal mode, when the image reaches focus on the face, when the light is sufficient, etc.

The process as defined herein can be extended to support Desktop based contact management software such as "ACT!" and Microsoft Outlook.

Example

User selects a contact;
User chooses the option "add image";
User browses a selection of images (e.g. Folders); and
User selects a single image, or alternatively selects a video clip Software detects face regions; and
Software crops the image to include only face (and optionally face or face-and-shoulders)

The software may select the level of cropping (face only, head & shoulders, etc).

Figures 6, 7:
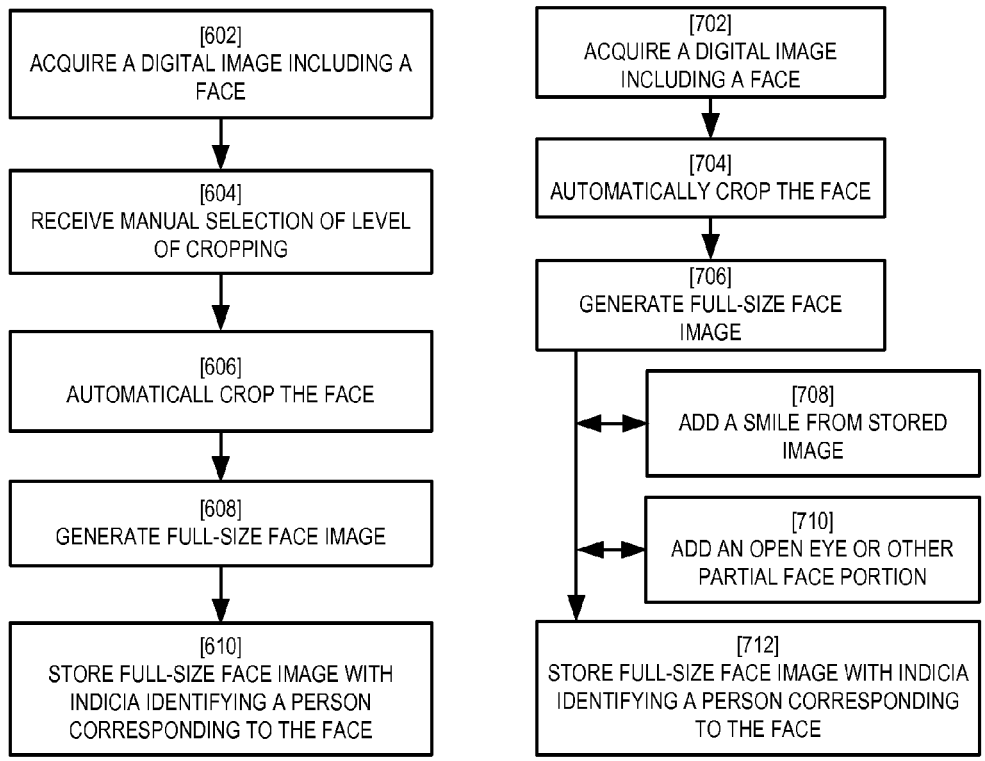
FIG. 6 illustrates a method of face categorization and annotation of a face image library including a selected level of cropping of the face in accordance with certain embodiments.
FIG. 7 illustrates a method of face annotation including replacing a portion of the face from an image store in accordance with certain embodiments.

FIG. 6 illustrates a method of face categorization and annotation of a face image library including a selected level of cropping of the face in accordance with certain embodiments. A digital image is acquired at 602 including a face. A manual selection of a level of cropping is received at 604 before or after the image is acquired. The face is then automatically cropped at 606. A full-size face image is generated at 608. The full size face image is stored at 610 along with identifying indicia of a person corresponding to the face.

Image processing can be added to add facial expressions such as smile. Accordingly, FIG. 7 illustrates a method of face annotation including replacing a portion of the face from an image store in accordance with certain embodiments. A digital image is acquired at 702 including a face. The face is then automatically cropped at 704. A non-facial item may be removed also at 704 or instead of cropping, and/or another face or other faces may be removed at 704. A full-size face image is generated at 706. A smile may be added from a stored image of the same person at 708, e.g., to replace a frown or occluded mouth in the image, or alternatively from a different person who may look more or less like the person. An open eye or other partial facial portion may be added at 710 from a stored image. The full size face image is stored at 710 along with identifying indicia of a person corresponding to the face.

For the recognition of known faces, the database may reside out of the handset (on the server), in case it is necessary to access a larger database than is desirable or perhaps than is possible on an handheld camera phone or other camera device.

Figure 8:
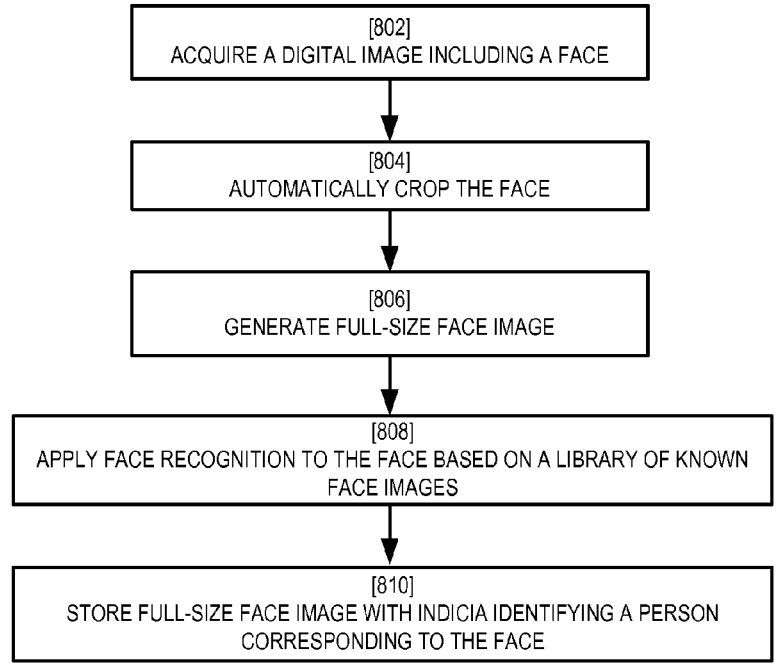
FIG. 8 illustrates a method of face detection and face recognition in accordance with certain embodiments.

FIG. 8 illustrates a method of face detection and face recognition in accordance with certain embodiments. A digital image is acquired at 802 including a face. The face is then automatically cropped at 804. Again, a non-facial item may be removed also at 804 or instead of cropping, and/or another face or other faces may be removed at 804. A full-size face image is generated at 806. Face recognition may be applied at 808 to the face based on a library of known face images. The full size face image is stored at 810 along with identifying indicia of a person corresponding to the face.

Face Recognition Training

Figure 9:
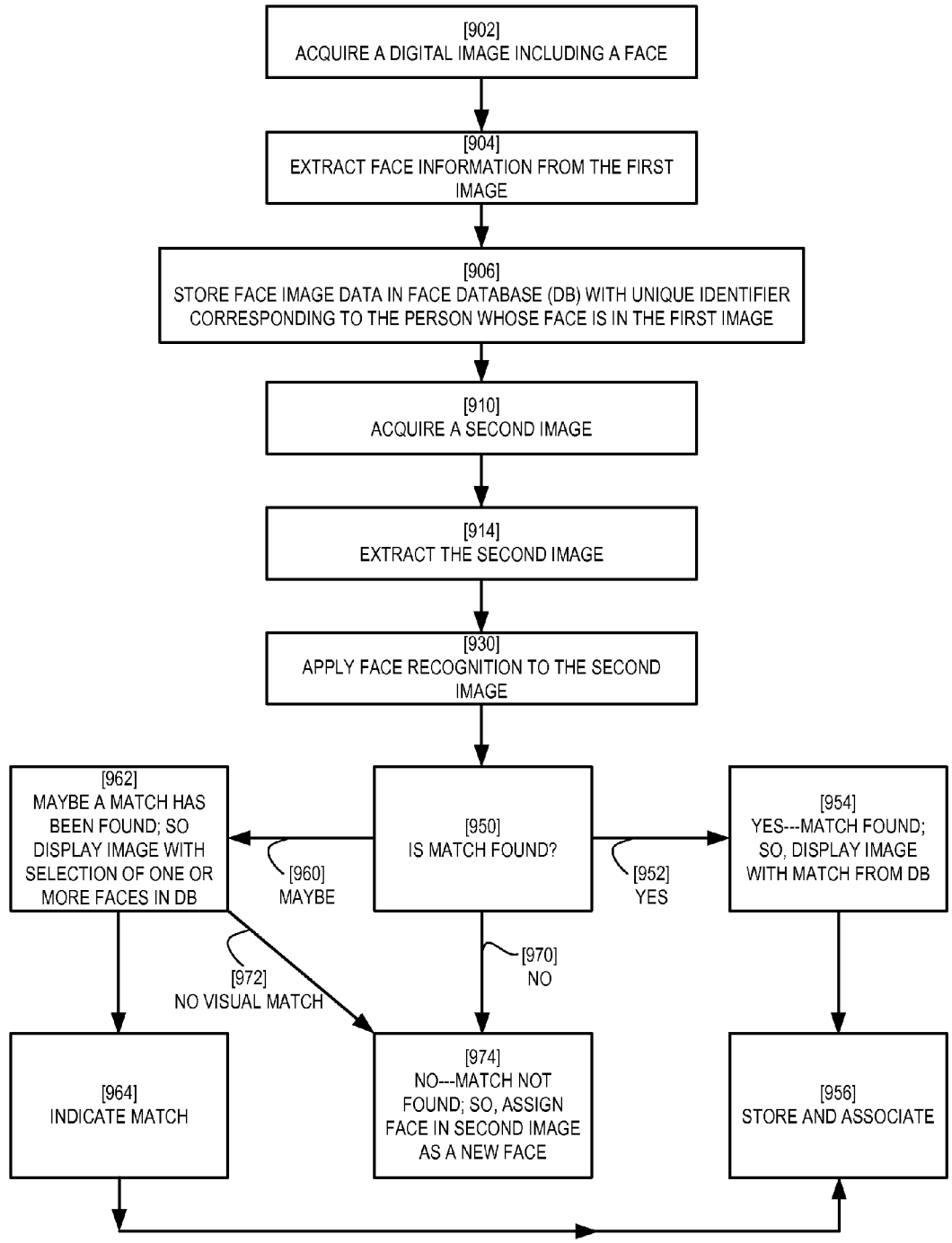
FIG. 9 illustrates a method of face recognition training in accordance with certain embodiments.

FIG. 9 illustrates a method of face recognition training in accordance with certain embodiments. FIG. 9 illustrates a method of face recognition training in accordance with certain embodiments. A first digital image, including a face is acquired at 902. Face image data are extracted, 904, from the image stored at 906 preferably with an unique identifier corresponding to a person whose face is in the first image. Image stored in 906 may be part of a collection of multiple faces stored in the same collection and/or database. A new image is acquired at 912, which may or may not include the face of the same person appearing in the first image. Face detection is applied to the image acquired in 912 and the face data is extracted at 914 from the image.

Face recognition is applied to the extracted face in the second image at 920. The extracted face of the new image is matched 930 with the collection of faces in the database. If a positive match with the first image is concluded at 952, the face of the first image is displayed at 954 concurrently with (next to or overlapping) the face of the second image to indicate or suggest a match of the faces in the first and new image(s). Optionally, 956, the new image is stored in the database and associated with the first image.

In a further embodiment, if the match does not reach an acceptable threshold level, 960, one or two or a few or several faces may be displayed on the screen concurrently with the second image at 962. The user can indicate at 964, e.g., manually or with voice command, which of the images in the database match the acquired second image. Such indication may be using touch screen, buttons or any other means of creating a selection. Optionally at 956, the second image is stored in the database and associated with the first image.

If no matching faces are recognized by the user at 972, or if during the automatic face-recognition stage at 950, no match is determined to any image in the database, the user may assign the new acquired image as a new person and add it to the database.

The method illustrated at FIG. 9 is particularly advantageous when used with a portable still camera, mobile phone or other portable digital image acquisition device or other image acquisition device that is likewise limited in its ability to receive text input from a user in a convenient way. For example, an attachable device may utilize the method, such as a device that is attachable to glasses, a watch, an article of clothing, to a bag, to a person's head, arm, leg, or torso, or to another device. During the training procedure, a digital camera or other device captures one or more pictures or frames in order to create a biometric signature that identifies that person. In one embodiment, that biometric signature would include the person's face. In other embodiments, the person's fingerprint, palm print, DNA, retinal pattern, or other unique feature of the person may be captured in a digital image.

A name or other association may be associated with this biometric signature to identify the person by name or other association, e.g., by user input. The biometric information corresponding to the person, e.g., face image data from at least one frame/picture used, are used for training and saved. Entry of the person's name is optional.

In certain embodiments, during training, an imaging device will also generate a GUID (Global Unique IDentifier) for each person stored in the database. This GUID may be relied upon to uniquely identify each person in the database.

In certain embodiments, during a matching procedure, a camera face recognition application, instead of displaying a name of a person to whom an acquired image has been matched, the application will display a small thumbnail of a face of the recognized person which was saved during training in a database.

When the imaging device, e.g., a digital still camera or camera-phone, is connected with a PC/Server, the user is also asked to provide a name to associate with each trained person. The application is also configured to allow for real time user feedback in the case that face recognition is not successful. The embodiment illustrated at FIG. 9 provides an intuitive UI for face recognition that is convenient to the user.

Alternative embodiments and features are provided for face categorization and annotation of a face image library. A digital image acquisition device such as a mobile camera phone or other handheld camera device, acquires a digital image of a scene that includes a face. A first digital image including a face may be acquired, and face image data may be extracted. The face image data may be stored in a face database or face image library, optionally with an unique identifier corresponding to a person whose face is understood to be in the first image. A second image is acquired, which may or may not include the face of the same person appearing in the first image, and the second image may be extracted. Face recognition may be applied to the face in the second image. A match may be found, or it may be determined that a match does not exist with any faces in the database, or it may be unclear with respect to certain of the stored faces.

When it is determined that a match is found, then the face of the first image may be displayed next to or overlapping the second image to indicate or suggest a match of the faces in the first and second images. In this case, the second image may be stored, including associating the second image with the first image.

When no faces in the database are determined to be a match, but a subset of one or more faces in the database includes faces with probabilities above a certain threshold of matching the second face, then the one or more faces may be displayed in a selectable fashion. When an indication of a match with at least one of the displayed faces is received, then the second image and/or the face contained therein may be stored, including associating the second image with the first image. However, when no indication of a match is received, or if it is determined that no match is found, then the second image and/or the face contained therein may be assigned as a new face, and stored without association to other faces in the database.

Alternative Embodiments

The face may be automatically cropped or one or more non-facial items may be removed from the digital image, or both, and a full-size face image may be generated. The full-size face image may be stored in a face image library along with other indicia identifying a person corresponding to the face.

The face image library may include an address book or a contact list, or both, of a mobile camera phone or other handheld camera device. A series of preview images may be acquired, and candidate face regions may be extracted from successive frames. Location data and a cumulative confidence level that the candidate face region comprises a face may be maintained, and based on information from the series of preview images, the method may include determining that the face is present within the digital image.

Manual input of further information relating to the face may be received for storing with the full-size face image. Other indicia may be input manually by a user of the digital image acquisition device. The face may be displayed, and the user may be prompted to associate the face with the identifying indicia. A list of probable members of a contact list may be displayed, and a selection may be made from the list by the user.

The generating of the full-size face image may include building a whole face from two or more partial face images, brightening a poorly illuminated face, rotating a rotated or tilted face, correcting a red-eye, white eye or golden eye defect, and/or correcting a photographic blemish artifact within the face of the digital image, or combinations of these. The method may include automatically transmitting the digital image to one or more persons identified within the image or to a user of the digital image acquisition device, or both.

The person identified with the face may be associated with an external device or service or both, and the digital image may be automatically transmitted to the external device or service or both. A manual selection of a level of cropping of the face from the digital image may be made by a user. A smile, an open eye and/or another partial face portion, may be added, from one or more stored facial images of the same identified person. Face recognition may be applied to the face based on a library of known face images.

While an exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention.

In addition, in methods that may be performed according to preferred embodiments herein and that may have been described above, the operations have been described in selected typographical sequences. However, the sequences have been selected and so ordered for typographical convenience and are not intended to imply any particular order for performing the operations, except for those where a particular order may be expressly set forth or where those of ordinary skill in the art may deem a particular order to be necessary.

In addition, all references cited herein as well as the background, invention summary, abstract and brief description of the drawings, as well as U.S. Pat. No. 6,407,777, and US published patent applications nos. 20040243671 (which discloses to use faces in emails), US 20040174434 (which discloses determining meta-information by sending to a server; then back to a mobile device), 2005/0041121, 2005/0031224, 2005/0140801, 2006/0204110, 2006/0093212, 2006/0120599, and 2006/0140455, and U.S. patent applications Nos. 60/773,714, 60/804,546, 60/865,375, 60/865,622, 60/829,127, 60/829,127, 60/821,165, 11/554,539, 11/464,083, 11/462,035, 11/282,954, 11/027,001, 10/764,339, 10/842,244, 11/024,046, 11/233,513, and 11/460,218, are all incorporated by reference into the detailed description of the preferred embodiments as disclosing alternative embodiments.

What is claimed is:

1. Within a processor-based, digital image acquisition device, a method of acquiring and displaying a face recognition result in real time based on identifying a candidate partial face region within an acquired digital image based on analysis of a series preview images, comprising:
   acquiring and analyzing with a digital image acquisition device a digital image of a scene that includes a partial face image from a sequential stream of multiple preview images of approximately the same scene acquired within one second prior to capture of the digital image;
   within the digital image acquisition device, based on the analyzing, automatically cropping the partial face image or removing one or more non-facial items from the digital image, or both, and thereby generating a more full-size partial face image;
   applying face recognition by comparing the more full-size partial face image to one or more images stored within a face image library; and
   displaying in real-time the digital image along with a face image, or another unique identifier and/or biometric data, or combinations thereof, extracted from a different digital image stored in the face image library that uniquely identifies the face in the digital image.

2. The method of claim 1, wherein the face image library comprises an address book or a contact list, or both, and wherein the device comprises a mobile camera phone or other handheld camera device.

3. The method of claim 1, wherein face recognition is applied to the more full-size partial face image comprising standard resolution, while the sequential stream of multiple images comprises a series of relatively low resolution preview images.

4. The method of claim 3, further comprising maintaining location data and a cumulative confidence level that a candidate partial face region belongs to a specific person, and based on information from the series of preview images including the partial face region, determining that the specific person is present within said digital image, and corresponds to a specific person named in an address book or contact list, or both, stored on said device.

5. The method of claim 1, further comprising receiving identifying indicia relating to the partial face image manually by a user of the digital image acquisition device.

6. The method of claim 5, further comprising displaying the partial face image and prompting the user to associate the partial face region with the identifying indicia; and automatically storing the more full-size partial face image along with the identifying indicia within the face image library.

7. The method of claim 1, further comprising displaying a list of probable members of a contact list and receiving a selection from the list by the user.

8. The method of claim 1, wherein the stream comprises a video stream.

9. The method of claim 1, further comprising building a whole face image from two or more partial face images.

10. The method of claim 1, further comprising adding a smile, an open eye or other partial face portion, or combinations thereof, to the partial face image.

11. The method of claim 10, further comprising retrieving said smile, open eye or other partial face region, or combinations thereof, from one or more stored facial images of the same identified person.

12. One or more non-transitory processor-readable media encoded with processor-readable code for programming a processor that is built into a portable device configured for acquiring a digital image of a scene that includes a partial face image from a sequential stream of multiple preview images of approximately the same scene to perform a method of face recognition within a digital image, wherein the method comprises:
   automatically analyzing one or more partial face images from said sequential stream of multiple preview images acquired within one second prior to capture of the digital image;
   based on the analyzing, automatically cropping the partial face image or removing one or more non-facial items from the digital image, or both, and thereby generating a more full-size partial face image; and
   applying face recognition by comparing the more full-size partial face image to one or more images stored within a face image library.

13. The one or more processor-readable media of claim 12, wherein the face image library comprises an address book or a contact list, or both, and wherein the portable device comprises a mobile camera phone or other handheld camera device.

14. The one or more processor-readable media of claim 12, wherein face recognition is applied to a main image, while the stream comprises a series of relatively low resolution preview images.

15. The one or more processor-readable media of claim 14, wherein the method further comprises maintaining location data and a cumulative confidence level that a candidate partial face image belongs to a specific person, and based on information from the series of preview images, determining that the specific person is present within said digital image, and corresponds to a specific person named in an address book or contact list, or both, stored on said device.

16. The one or more processor-readable media of claim 12, wherein the method further comprises receiving identifying indicia relating to the partial face image manually by a user of the digital image acquisition device.

17. The one or more processor-readable media of claim 16, wherein the method further comprises displaying the partial face image and prompting the user to associate the partial face image with the identifying indicia; and automatically storing the more full-size partial face image along with the identifying indicia within the face image library.

18. The one or more processor-readable media of claim 12, wherein the method further comprises displaying a list of probable members of a contact list and receiving a selection from the list by the user.

19. The one or more processor-readable media of claim 12, wherein the stream comprises a video stream.

20. The one or more processor-readable media of claim 12, wherein the method further comprises building a whole face image from two or more partial face images.

21. The one or more processor-readable media of claim 12, wherein the method further comprises adding a smile, an open eye or other partial face portion, or combinations thereof, to the partial face image.

22. The one or more processor-readable media of claim 21, wherein the method further comprises retrieving said smile, open eye or other partial face region, or combinations thereof, from one or more stored facial images of the same identified person.

23. A digital image acquisition device, comprising:
a lens,
an image sensor,
a processor and
a memory having processor-readable code embodied therein for programming the processor to perform a face recognition method, wherein the method comprises:
acquiring and analyzing with a digital image acquisition device a digital image of a scene that includes a partial face image from a sequential stream of multiple preview images of approximately the same scene acquired within one second prior to capture of the digital image;
based on the analyzing, automatically cropping the partial face image or removing one or more non-facial items from the digital image, or both, and thereby generating a more full-size partial face image; and
applying face recognition by comparing the more full-size partial face image to one or more images stored within a face image library.

24. The device of claim 23, wherein the face image library comprises an address book or a contact list, or both, and wherein the device comprises a mobile camera phone or other handheld camera device.

25. The device of claim 23, wherein face recognition is applied to a main image, while the stream comprises a series of relatively low resolution preview images.

26. The device of claim 25, wherein the method further comprises maintaining location data and a cumulative confidence level that a candidate partial face image belong to a specific person, and based on information from the series of preview images, determining that the specific person is present within said digital image, and corresponds to a specific person named in an address book or contact list, or both, stored on said device.

27. The device of claim 23, wherein the method further comprises receiving identifying indicia relating to the partial face image manually by a user of the digital image acquisition device.

28. The device of claim 27, wherein the method further comprises displaying the partial face image and prompting the user to associate the partial face image with the identifying indicia; and automatically storing the more full-size partial face image along with the identifying indicia within the face image library.

29. The device of claim 23, wherein the method further comprises displaying a list of probable members of a contact list and receiving a selection from the list by the user.

30. The device of claim 23, wherein the stream comprises a video stream.

31. The device of claim 23, wherein the method further comprises building a whole face image from two or more partial face images.

32. The device of claim 23, wherein the method further comprises adding a smile, an open eye or other partial face portion, or combinations thereof, to the partial face image.

33. The device of claim 32, wherein the method further comprises retrieving said smile, open eye or other partial face region, or combinations thereof, from one or more stored facial images of the same identified person.

* * * * *